United States Patent
Cook

(10) Patent No.: US 10,834,945 B1
(45) Date of Patent: Nov. 17, 2020

(54) METHODS OF HIGH PRESSURE PROCESSING AND PRODUCTS PRODUCED THEREWITH

(71) Applicant: Daniel Leon Cook, Anchorage, AK (US)

(72) Inventor: Daniel Leon Cook, Anchorage, AK (US)

(*) Notice: Subject to any disclaimer, the term of this patent is extended or adjusted under 35 U.S.C. 154(b) by 753 days.

(21) Appl. No.: 15/010,280

(22) Filed: Jan. 29, 2016

Related U.S. Application Data

(60) Provisional application No. 62/109,752, filed on Jan. 30, 2015.

(51) Int. Cl.
*A23L 3/015* (2006.01)
*A23B 7/00* (2006.01)

(52) U.S. Cl.
CPC .............. *A23L 3/0155* (2013.01); *A23B 7/00* (2013.01); *A23V 2002/00* (2013.01)

(58) Field of Classification Search
None
See application file for complete search history.

(56) References Cited

U.S. PATENT DOCUMENTS

| | | | | |
|---|---|---|---|---|
| 4,122,197 A | * | 10/1978 | Krugmann | B65B 1/28 426/232 |
| 4,717,575 A | * | 1/1988 | Larroche | A23L 3/0155 220/203.09 |
| 4,978,025 A | * | 12/1990 | Fougeres | B65D 31/12 222/105 |
| 6,322,837 B1 | | 11/2001 | Nakayama | |
| 7,520,938 B2 | | 4/2009 | Sakashita et al. | |
| 8,182,853 B2 | | 5/2012 | Puaud et al. | |
| 8,507,020 B2 | | 8/2013 | DesLauriers et al. | |
| 2002/0076347 A1 | | 6/2002 | Maerz | |
| 2003/0170356 A1 | | 9/2003 | Yuan et al. | |
| 2004/0033296 A1 | | 2/2004 | Yuan et al. | |

(Continued)

FOREIGN PATENT DOCUMENTS

| | | |
|---|---|---|
| EP | 1733871 B1 | 5/2006 |
| WO | WO 01/58286 A1 | 8/2001 |

(Continued)

OTHER PUBLICATIONS

Nestle Waters, "Water Stories" Nov. 21, 2014 http://web.archive.org/web/20150106143017/https://waterstories.nestle-waters.com/health/cooking-recipes-with-sparkling-water/ (Year: 2014).*

(Continued)

*Primary Examiner* — Viren A Thakur
(74) *Attorney, Agent, or Firm* — Daniel A. Blasiole; DeWitt LLP

(57) ABSTRACT

High pressure processing of substances such as foodstuffs and products produced therewith. The methods include externally pressurizing a container containing a substance immersed in a liquid, then displacing at least a portion of the liquid from the substance with a gas and sealing the substance and the gas from at least a portion of the displaced liquid. The methods are particularly useful for producing packaged substances, such as packaged fruits or vegetables, that are advantageously processed with high pressure in a liquid but are disadvantageously stored in the liquid after the processing.

12 Claims, 11 Drawing Sheets

(56) References Cited

U.S. PATENT DOCUMENTS

| | | |
|---|---|---|
| 2005/0112252 A1 | 5/2005 | Tewari |
| 2005/0266128 A1 | 12/2005 | Yuan et al. |
| 2007/0154600 A1* | 7/2007 | Parry ................. A23B 9/18 426/118 |
| 2008/0311259 A1 | 12/2008 | Singh et al. |
| 2010/0047403 A1* | 2/2010 | Johnson ............. B65D 75/008 426/113 |
| 2012/0276258 A1* | 11/2012 | Nafisi-Movaghar .... A23L 3/015 426/270 |
| 2012/0297732 A1* | 11/2012 | Dupont ................. B65B 3/18 53/432 |
| 2012/0308699 A1* | 12/2012 | Dupont ................. B65B 3/18 426/397 |
| 2013/0183420 A1* | 7/2013 | Shimek ................. A23B 7/005 426/326 |
| 2013/0209628 A1* | 8/2013 | Turover ................ B65D 81/34 426/234 |
| 2014/0216162 A1 | 8/2014 | Trahan et al. |

FOREIGN PATENT DOCUMENTS

| | | | |
|---|---|---|---|
| WO | WO-2013027067 A1 * | 2/2013 | ........... A23L 3/3418 |
| WO | WO 2015/160269 | 10/2015 | |

OTHER PUBLICATIONS

"Your Modern Family" Oct. 21, 2014 http://web.archive.org/web/20141021194803/https://www.yourmodernfamily.com/avoid-the-mess/ (Year: 2014).*

Balasubramaniam et al., "Preserving Foods through High-Pressure Processing" Food Technology 62.11 (2008): 32-38.

Barbosa-Canovas et al., "Food Sterilization by Combining High Pressure and Thermal Energy" in Food Engineering: Intergrated Approaches, Gutierrez-Lopez, G.F.; Welti-Chanes, J.; Parada-Arias, E. (Eds.) 2008, XXIV, ISBN: 978-0-387-75429-1.

Considine et al., "High-pressure processing—effects on microbial food safety and food quality." FEMS Microbiol Lett. 2008 281(1):1-9.).

* cited by examiner

US 10,834,945 B1

METHODS OF HIGH PRESSURE PROCESSING AND PRODUCTS PRODUCED THEREWITH

FIELD OF THE INVENTION

The invention is directed to high pressure processing of substances such as foodstuffs and products produced therewith.

BACKGROUND

Food processing involves the transformation of raw animal or plant materials into consumer-ready products, with the objective of stabilizing food products by preventing or reducing negative changes in quality. To consumers, the most important attributes of a food product are its sensory characteristics (e.g. texture, flavor, aroma, shape, and color). These determine an individual's preference for specific products. A goal of food manufacturers is to develop and employ processing technologies that retain or create desirable sensory qualities or reduce undesirable changes in food due to processing. Physical (e.g. heating, freezing, dehydration, and packaging) and chemical (e.g. reduction of pH or use of preservatives) preservation methods continue to be used extensively and continue to evolve at a rapid rate in order to improve the efficiency and effectiveness of these processes. The most common method of food preservation used today is thermal treatment (e.g. pasteurization). Although heating food effectively reduces levels of microorganisms, such as vegetative microorganisms, such processing can alter the natural taste, flavor, texture, and overall integrity of food and destroy vitamins.

An alternative to thermal treatment for inactivating microorganisms is high pressure processing. Microbial inactivation by high pressure processing is the result of a combination of factors. The primary site for pressure-induced microbial inactivation is the cell membrane (e.g. modification in permeability and ion exchange). Microorganisms are resistant to selective chemical inhibitors due to their ability to exclude such agents from the cell, mainly by the action of the cell membrane. However, if the membrane becomes damaged, this tolerance is lost. In addition, high pressure processing causes changes in cell morphology and biochemical reactions, protein denaturation, and inhibition of genetic mechanisms. Other mechanisms of action, which may be responsible for microbial inactivation, include the denaturation of key enzymes and the disruption of ribosomes.

Although microorganism inactivation through high pressure processing is effective for certain applications, the technology has several disadvantages for certain types of foodstuff. High pressure processing of fruits and vegetables, particularly fresh-cut fruits and vegetables, may be beneficial for extending their shelf life. However, when fruits and vegetables undergo conventional high pressure processing, they become mushy because of the pressure exerted on the food product, which crushes the product if there are air spaces between adjacent pieces. Conducting high pressure processing in the presence of a liquid medium to fill the air spaces between adjacent pieces does not correct this problem because the fruits and vegetables tend to absorb the liquid and break down and dissolve in the liquid over time during storage.

A process for high pressure processing of foodstuffs that preserves the integrity of the foodstuff during and after the processing is needed.

SUMMARY OF THE INVENTION

The invention provides methods and products produced therewith that address the above-mentioned need.

One aspect of the invention is a method of processing a substance. The method comprises externally pressurizing a container containing the substance immersed in a liquid, then displacing at least a portion of the liquid from the substance with a gas and sealing the substance and the gas from at least a portion of the displaced liquid. The substance may be a foodstuff. The pressurizing may be performed for a time and at a pressure sufficient to inactivate at least one microorganism in the container.

In some versions of the invention, the gas is introduced within the container prior to at least one of the displacing and the sealing. In some versions of the invention, the gas is introduced within the container substantially simultaneously with at least one of the displacing and the sealing.

The introducing may increase a parameter selected from the group consisting of internal volume of the container and internal pressure of the container. The introducing may result in a first internal pressure within the container, and the displacing and sealing may result in a second internal pressure within the container, wherein the first internal pressure is greater than the second internal pressure. The introducing may result in a first internal volume within the container, and the displacing and sealing may result in a second internal volume within the container, wherein the first internal volume is greater than the second internal volume. The gas may be introduced within the container in vapor phase or may be introduced in condensed phase followed by vaporization of the gas within the container. The gas may be introduced prior to the external pressurizing or after the external pressurizing.

In some versions, the displacing and/or the sealing comprises decreasing a parameter selected from the group consisting of internal volume of the container and internal pressure of the container.

In some versions, the displacing comprises passing the liquid through a restricted space permeable to the liquid but not the substance.

In some versions, the displacing comprises partitioning the gas and the substance in a first reservoir space within the container and the liquid in a second reservoir space within the container, and the sealing comprises sealing the first reservoir space from the second reservoir space. The partitioning may comprise passing the liquid through a restricted space between the first reservoir space and the second reservoir space, the restricted space being permeable to the liquid but not the substance. The partitioning may comprise removing at least a portion of the liquid from the second internal space prior to the sealing. The removing may comprise removing at least a volume of the liquid approximately equal to a total volume of the liquid present in the container during the external pressurizing minus a maximum volume defined by the second reservoir space. The first reservoir space may be sealed from the second reservoir space while at least a portion of the liquid remains in the second reservoir space.

In some versions, the displacing comprises removing the liquid from the container. The liquid may be removed through a valve or a re-sealable septum.

Another aspect of the invention is a packaged substance produced according to the methods described herein. In some versions, the substance is a foodstuff, and the foodstuff has a characteristic selected from the group consisting of a lower bacterial count, enhanced shelf life, an enhanced flavor, a more natural hue, an enhanced color intensity, an enhanced aroma, a firmer texture, enhanced structural integrity, and decreased liquid separation than a corresponding product not produced according to the methods described herein.

The objects and advantages of the invention will appear more fully from the following detailed description of the preferred embodiment of the invention made in conjunction with the accompanying drawings.

BRIEF DESCRIPTION OF THE DRAWINGS

FIG. 1A shows the container prior to vaporization and expansion of a gas. FIG. 1B shows the container after vaporization and expansion of the gas. FIG. 1C shows the container after displacement of a liquid from the container with the expanded gas.

FIG. 2A shows the container prior to vaporization and expansion of a gas. FIG. 2B shows the container after vaporization and expansion of the gas. FIG. 2C shows the container after attachment of a restriction device. FIG. 2D shows the container after displacement of a liquid from pomegranate arils with the gas. FIG. 2E shows the container after sealing the liquid from the gas and pomegranate arils and separation of the liquid from the container.

FIG. 3A shows the container prior to vaporization and expansion of a gas. FIG. 3B shows the container after vaporization and expansion of the gas. FIG. 3C shows the container after attachment of a restriction device. FIG. 3D shows the container after partial displacement of a liquid from pomegranate arils with the gas. FIG. 3E shows the container after complete displacement of the liquid from the pomegranate arils with the gas. FIG. 3F shows the container after sealing the liquid from the gas and pomegranate arils and separating the liquid from the container.

FIG. 4A shows the container prior to vaporization and expansion of a gas. FIG. 4B shows the container after formation of a restriction device. FIG. 4C shows the container after vaporization and expansion of the gas. FIG. 4D shows the container after partial displacement of a liquid from pomegranate arils with the gas. FIG. 4E shows the container after complete displacement of the liquid from the pomegranate arils with the gas. FIG. 4F shows the container after sealing the liquid from the gas and pomegranate arils and separating the liquid from the container.

DETAILED DESCRIPTION OF THE INVENTION

Figure 1A:
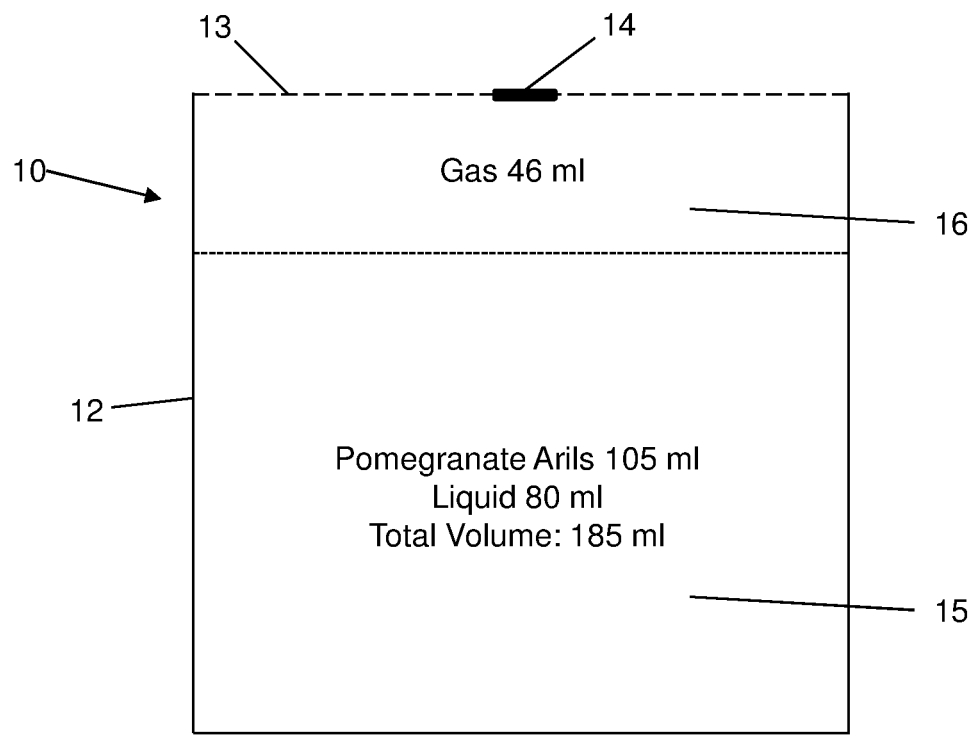
FIGS. 1A-1C show schematics of a container to illustrate aspects of a first version of the invention.

One aspect of the invention is directed to methods of processing a substance through pressurization. The pressurization may be for the purpose of sterilization, food preservation, microbial decontamination, and/or inactivation of microorganisms or enzymes. Accordingly, in some versions of the invention, the substance is pressurized by an amount and a time sufficient to inactivate one or more microbes. Pressurization for other purposes is also encompassed by the present methods.

The pressures and conditions for pressurizing a substance to inactivate microbes in a substance are well known in the art. See, for example, US 2012/0276258 to Nafisi-Movaghar et al., WO 2001/58286 to Stolt et al., US 2005/0112252 to Tewari, U.S. Pat. No. 6,322,837 to Nakayama, U.S. Pat. No. 8,507,020 to DesLauriers et al., US 2014/0216162 to Trahan et al., US 2003/0170356 to Yuan et al., US 2005/0266128 to Yuan et al., US 2004/0033296 to Yuan et al., Balasubramaniam et al. (Balasubramaniam, D Farkas, and E Turek. "Preserving Foods through High-Pressure Processing" *Food Technology* 62.11 (2008): 32-38), Barbosa-Canovas et al. (G. V. Barbosa-Canovas and P. Juliano, "Food Sterilization by Combining High Pressure and Thermal Energy" in *Food Engineering: Intergrated Approaches*, Gutierrez-Lopez, G. F.; Welti-Chanes, J.; Parada-Arias, E. (Eds.) 2008, XXIV, ISBN: 978-0-387-75429-1), and Considine et al. (Considine K M, Kelly A L, Fitzgerald G F, Hill C, Sleator R D. High-pressure processing—effects on microbial food safety and food quality. *FEMS Microbiol Lett.* 2008 281(1):1-9.), all of which are incorporated herein by reference. Such processes are often referred to as high pressure processing (HPP), high hydrostatic pressure (HHP) processing, ultra high pressure (UHP) processing, pascalization, or bridgmanization.

Exemplary pressures for the pressurization include pressures of from about 2,000 psi to about 150,000 psi, such as from about 10,000 psi to about 130,000 psi, or from about 40,000 psi to about 90,000 psi. Pressures above or below these values may be acceptable. The pressurization may be conducted for a time of from about a millisecond pulse to about 2 hours, such as from about 1 second to about 2 hours, from about 15 seconds to about 2 hours, from about 15 seconds to about 1 hour, from about 15 seconds to about 30 minutes, from about 15 seconds to about 10 minutes, from about 15 seconds to about 5 minutes, from about 15 seconds to about 1 minute, from about 30 seconds to about 2 hours, from about 30 seconds to about 1 hour, from about 30 seconds to about 30 minutes, from about 30 seconds to about 10 minutes, from about 30 seconds to about 5 minutes, from about 30 seconds to about 1 minute, from about 1 minute to about 1 hour, from about 1 minute to about 30 minutes, from about 1 minute to about 10 minutes, from about 1 minute to about 5 minutes, from about 5 minutes to about 45 minutes, or from about 10 minutes to about 30 minutes. Times above or below these values may be acceptable. The pressurization may occur in a single pulse or a series of repeated pulses. The pressurization may be conducted at a temperature below 0° C. (to minimize any effects of adiabatic heat) to above 100° C. Temperatures below about 100° C. are preferred for processing certain foodstuffs to avoid deleterious effects of high heat treatment. Exemplary temperatures include from about −10° C. to about 100° C., from about 0° C. to about 100° C., from about 1° C. to about 99° C., from about 1° C. to about 90° C., from about 1° C. to about 50° C., or from about 4° C. to about 40° C. Temperatures above or below these values may be acceptable.

The substance may be any substance for which processing with pressurization is desired. The substance may be a non-liquid, non-gaseous substance, such as a solid or semi-solid substance. The substance may be a food product, a cosmetic product, a pharmaceutical product, or other types of products. Among food products, the substance may be a vegetable product, fruit product, or meat product, among others. The food product may be whole, subdivided into smaller sizes, or comminuted. The food product may be subdivided or comminuted by cutting, slicing, dicing, pureeing, peeling, and/or mashing. Exemplary fruits include, without limitation, apples, peaches, pears, oranges, lemons, limes, grapefruit, grapes, cherries, mangoes, pineapples, papaya, olives, berries, pomegranate arils, and the like. Exemplary vegetables include, without limitation, green vegetables, orange vegetables, starchy vegetables, root vegetables, peas, beans, corn, sweet corn, carrots, peppers and other vegetables. Exemplary green vegetables include, without limitation, celery, green beans, green peppers, snow peas, snap peas, asparagus, zucchini, broccoli, cucumbers, grape tomatoes, onions, and the like.

The substance is preferably pressurized while substantially submerged or immersed in a liquid and contained with the liquid in a sealed container, such that the pressure is applied to the outside of the container. The container is preferably a fluid-impermeable container. The container may be flexible, flexible and resilient, flexible and non-resilient, rigid, or a combination thereof. Examples of containers include flexible, resilient plastic bags or pouches; flexible, non-resilient plastic bags or pouches; rigid plastic cups with a flexible resilient or flexible non-resilient film cover; or other types of containers.

The liquid may comprise any liquid capable of transmitting hydrostatic pressure. The liquid, for example, may include water, oil, or both. The liquid may include salts, buffers, preservatives, antioxidants, or other agents. Such agents may aid in the preservation of the substance. The liquid may comprise a brine solution including water and acid, such as citric acid, vinegar, or any organic or inorganic food-grade acid, or combination thereof. The liquid may include other additives such as, for example and without limitation, sugar, salt, olive oil, hydrocolloids such as xanthan gum, pepper puree, and/or flavorings. The liquid may comprise tomato juice, vegetable juice, or fruit juice, with or without one or more additives. In some versions, the liquid comprises the enzyme pectinmethylesterase, preferably, with a source of calcium ions. The liquid is preferably included in an amount sufficient to submerge the substance and fill void spaces around the substance.

The present invention provides for displacing the liquid from the substance with a gas after the pressurization, as well as sealing the substance and the gas from the displaced liquid. These steps effectively remove the liquid from the substance contained in the container. For foodstuffs such as fruits and vegetables, removing the liquid after the pressurizing is important for preserving the fresh-like flavor, hue, color intensity, aroma, texture, integrity, and moisture/liquid content of the foodstuffs. Removing the liquid from the container after pressurization without contaminating the foodstuff or internal portions of the container, however, is a non-trivial endeavor, as the seal of the container must be at least temporarily broken in some form. Methods provided herein permit removing the liquid while minimizing the chances of contamination.

Exemplary gases for use in the methods described herein include carbon monoxide (CO), nitric oxide (NO), nitrous oxide ($N_2O$), hydrogen ($H_2$), oxygen ($O_2$), a noble gas such as helium (He), argon (Ar), krypton (Kr), xenon (Xe) and neon (Ne), carbon dioxide ($CO_2$), nitrogen ($N_2$), or mixtures thereof, among others.

Displacing the liquid from the substance with the gas comprises, at some point prior to or during the displacing, introducing the gas into the container. The gas may be introduced into the container by a number of ways. For example, the gas may be injected, blown, or pumped into the container, among other ways. The gas may be introduced through an inlet in the container. Exemplary inlets include a re-sealable septum, a one-way valve, a two-way valve, a hole in the container, or other type of passageway. The gas may be introduced with a needle, tubing, or other delivery device. The gas may be introduced in the vapor phase or in condensed (liquid) phase followed by vaporization within the container. Exemplary gases introduced in the condensed phase include cryogenic liquids such as liquid nitrogen or gases dissolved in liquid such as nitrogenated water or carbonated water. The vaporization may be induced through equilibration of the condensed gas within the container to suitable temperatures and pressures, whether passively or through manipulation of the container, or through agitation (shaking, etc.) of the container.

Introducing the gas into the container may be performed in a manner that increases the internal volume of the container without substantially increasing the internal pressure of the container, increases the internal pressure of the container without substantially increasing the internal volume of the container, or increases both the internal volume and the internal pressure of the container. Increasing the internal volume of the container may occur when the gas is introduced to a flexible container that is partially collapsed prior to introducing the gas. Introducing the gas can thus inflate the container with or without substantially increasing the internal pressure. Increasing the internal pressure of the container may occur when the gas is introduced to a flexible, non-resilient container that is substantially inflated prior to introducing the gas. Introducing the gas thus increases the internal pressure without substantially increasing the internal volume. Other examples are apparent from the disclosure herein.

The gas is preferably introduced in at least an amount sufficient for the internal pressure and volume of the container to be at desired values after all or nearly all of the liquid is displaced by the gas and removed and sealed from the container.

The gas may be introduced at any point prior to, or simultaneous with, the displacing. For example, the gas may be introduced prior to the pressurizing, after the pressurizing but prior to the displacing, simultaneously with the displacing, or any combination thereof. In some cases, some of the liquid may be removed from the container prior to introducing the gas, and the remaining liquid can then be displaced with the gas after, or simultaneous with, introducing the gas.

The displacing may be performed with the gas by any of a number of methods. In some versions, the displacing is performed by using the pressure of the gas to force the liquid from the container. If the gas is already present in the container prior to the displacing, an external pressure (e.g., squeezing, etc.) applied to the outside of the container or an internal pressure provided by the gas itself may be used to force the liquid from the container through an outlet. If the gas is not already present in the container prior to the displacing, the gas may be introduced in a manner that simultaneously forces the liquid from the container. In all such cases, the pressure provided by the gas is instrumental in removing the liquid from the container. The outlet may be a valve, a septum (e.g., temporarily pierced with a needle), or a mere opening in the container. The container is preferably oriented so that the liquid is directed by gravity toward the outlet. The liquid may be removed with a needle, tubing, or drained into open air, among other methods. If the pressure of the gas is insufficient to force the liquid from the container or applying an external pressure on the container is undesirable, the liquid may be suctioned from the container.

In some versions, the displacing is performed by passing the liquid through a restricted space within the container. A restricted space is a space within the container sized to permit the passage of the liquid but not the substance therethrough. The restricted space preferably subdivides the container into at least two separate internal reservoir spaces. The restricted space may be a structural part of the container itself, such as partial sealing of the container as exemplified in Example 4 or an internal filter in the container, etc., or may be imposed on the container by an outer restriction device, as exemplified in Examples 2 and 3. Suitable restriction devices include clamps, nooses, or even a user's hands.

In some versions, the liquid and substance are both present after the pressurizing and prior to the displacing within a first reservoir space within the container. The container may be inverted to pass the liquid from the first reservoir space through a restricted space and into a second reservoir space, thereby displacing the liquid surrounding the substance with the gas. The liquid may then sealed from the substance and the gas by sealing between the first reservoir space and the second reservoir space, such as at or near the restricted space. In some versions, at least some of the liquid is removed from the second reservoir space through an outlet in the second reservoir space prior to sealing. After sealing, the sealed first reservoir space containing the substance and gas may be separated from the second reservoir space containing the liquid. If the container is sealed at the restricted space, it is preferably sealed while at least a portion of the liquid remains in the second reservoir space. This prevents exposure of the previously pressurized substance to the outside of the container and thereby minimizes the risk of contamination.

In some versions, the second reservoir space defines a volume less than the volume of the liquid present prior to the displacing. This minimizes the amount of gas-filled headspace required to be present in the container while the substance is immersed in the liquid. Upon inversion of the container, a volume of liquid approximately equal to the total volume of liquid present in the container prior to the displacing minus the volume of defined by the second reservoir space remains in the first reservoir space. Thus, to completely drain the liquid from the first reservoir space, thereby completely displacing the liquid from the substance, a volume of liquid at least approximately equal to the volume remaining in the first reservoir space is removed from the second reservoir space prior to sealing at the restricted space.

Sealing the substance and the gas from the liquid can occur in a variety of ways. The container can be heat-sealed, pressure-sealed, or sealed by virtue of valve closure or septum closure.

The displacing and/or the sealing may involve or result in a reduction of at least one of the internal pressure of the container and the internal volume of the container. A reduction in internal pressure, for example, results when the pressure of the gas is used to force the liquid out of the container during the displacing. A reduction in internal volume, for example, results when the liquid is partitioned from the substance and gas in two separate internal spaces within the container and the container is subsequently sealed between the two spaces, when an external pressure is imposed on the outside of the container to expel liquid in such a manner that partially collapses the container, or when a resilient container is permitted to retract (by, e.g., opening at an outlet) to expel liquid. As is apparent from the present disclosure, a reduction in internal pressure can occur without a reduction in internal volume, a reduction in internal volume can occur without a reduction in internal pressure, or a reduction of both internal volume and internal pressure can occur.

The internal pressure of the container after the sealing step may be greater than about 1 atm of pressure (about 15 psi), about 1 atm of pressure, or lower than about 1 atm of pressure.

Substantially all or only a portion of the liquid present in the container prior to the displacing step may be displaced and sealed from the gas and substance in the displacing and sealing steps. For example, substantially all or only a portion of the liquid present in the container prior to the displacing step may be displaced from the substance and gas in the displacing step. If only a portion of the liquid present in the container prior to the displacement step is displaced, at least about 1%, at least about 5%, at least about 10%, at least about 20%, at least about 30%, at least about 40%, at least about 50%, at least about 60%, at least about 70%, at least about 80%, at least about 90%, at least about 95%, at least about 97%, at least about 99%, or more of the liquid present in the container prior to the displacing step may be displaced in the displacing step. Similarly, substantially all or only a portion of the displaced liquid may be sealed from the substance and gas. If only a portion of the displaced liquid is sealed from the substance and gas, at least about 1%, at least about 5%, at least about 10%, at least about 20%, at least about 30%, at least about 40%, at least about 50%, at least about 60%, at least about 70%, at least about 80%, at least about 90%, at least about 95%, at least about 97%, at least about 99%, or more of the displaced liquid is sealed in the sealing step. Finally, substantially all or only a portion of the liquid present in the container prior to the displacing step may be displaced and sealed from the substance and gas in the displacing and sealing steps. If only a portion of the liquid present in the container prior to the displacing step is displaced and sealed from the gas and substance, at least about 1%, at least about 5%, at least about 10%, at least about 20%, at least about 30%, at least about 40%, at least about 50%, at least about 60%, at least about 70%, at least about 80%, at least about 90%, at least about 95%, at least about 97%, at least about 99%, or more of the liquid present in the container prior to the displacing step may be displaced and sealed in the displacing and sealing steps. For the purpose of maintaining foodstuff in a fresh-like state, displacing and sealing all or nearly all of the liquid present in the container is preferred. At least some of the gas originally introduced in the container may be removed in the displacing and/or sealing steps.

The methods of the invention are capable of generating packaged food products that have distinct differences and advantages with respect conventional packaged food products. Packaged food products made with the methods of the invention, for example, have a significantly lower microorganism count and increased shelf life than freshly packaged food products (e.g., food products not undergoing high pressure processing or pasteurization). For example, the pressurization methods of the invention may reduce the microorganism count by 1-5 logs or more, such that the packaged food products made with the methods of the invention may have a 1-5-log or more reduction in microorganism count with respect to freshly packaged food products. Accordingly, the packaged food products of the present invention may have at least a 1.1-fold, 1.25-fold, 1.5-fold, 1.75-fold, 2-fold, 2.5-fold, 3-fold or more increase in shelf life.

The methods of the invention are capable of producing a packaged food product that has distinct differences and advantages with respect to a packaged food product made with other microorganism-reducing methods, such as high pressure processing in the absence of a surrounding liquid, high pressure processing in the presence of a surrounding liquid followed by storage in the liquid, or pasteurization (involving heat treatment). These other microorganism-reducing methods result in food products with decreased flavor, discoloration, reduced color intensity, decreased aroma, mushiness, a tendency to break down or disintegrate, and liquid separation (from the solid portions of the foodstuff). Accordingly, food products made with the methods of the invention have an enhanced flavor, a more fresh-like hue, an enhanced color intensity, an enhanced aroma, a firmer texture, enhanced structural integrity, and decreased liquid separation compared to food products made with other microorganism-reducing methods.

The terms "solid," "liquid," and "gas," used herein refer to substances that exist in the solid, liquid, or gas phases, respectively, at 1 atm of pressure and 25° C., unless the context clearly dictates otherwise. Thus, the phrase, "gas in condensed phase" refers to a substance that exists in the gas phase at 1 atm of pressure and 25° C. but has been exposed to conditions (e.g., low temperatures and/or high pressures) to at least temporarily convert it to the liquid phase.

The elements and method steps described herein can be used in any combination whether explicitly described or not.

All combinations of method steps as used herein can be performed in any order, unless otherwise specified or clearly implied to the contrary by the context in which the referenced combination is made.

As used herein, the singular forms "a," "an," and "the" include plural referents unless the content clearly dictates otherwise.

Numerical ranges as used herein are intended to include every number and subset of numbers contained within that range, whether specifically disclosed or not. Further, these numerical ranges should be construed as providing support for a claim directed to any number or subset of numbers in that range. For example, a disclosure of from 1 to 10 should be construed as supporting a range of from 2 to 8, from 3 to 7, from 5 to 6, from 1 to 9, from 3.6 to 4.6, from 3.5 to 9.9, and so forth.

All patents, patent publications, and peer-reviewed publications (i.e., "references") cited herein are expressly incorporated by reference to the same extent as if each individual reference were specifically and individually indicated as being incorporated by reference. In case of conflict between the present disclosure and the incorporated references, the present disclosure controls.

It is understood that the invention is not confined to the particular construction and arrangement of parts herein illustrated and described, but embraces such modified forms thereof as come within the scope of the claims.

EXAMPLES

Example 1

Figure 1B:
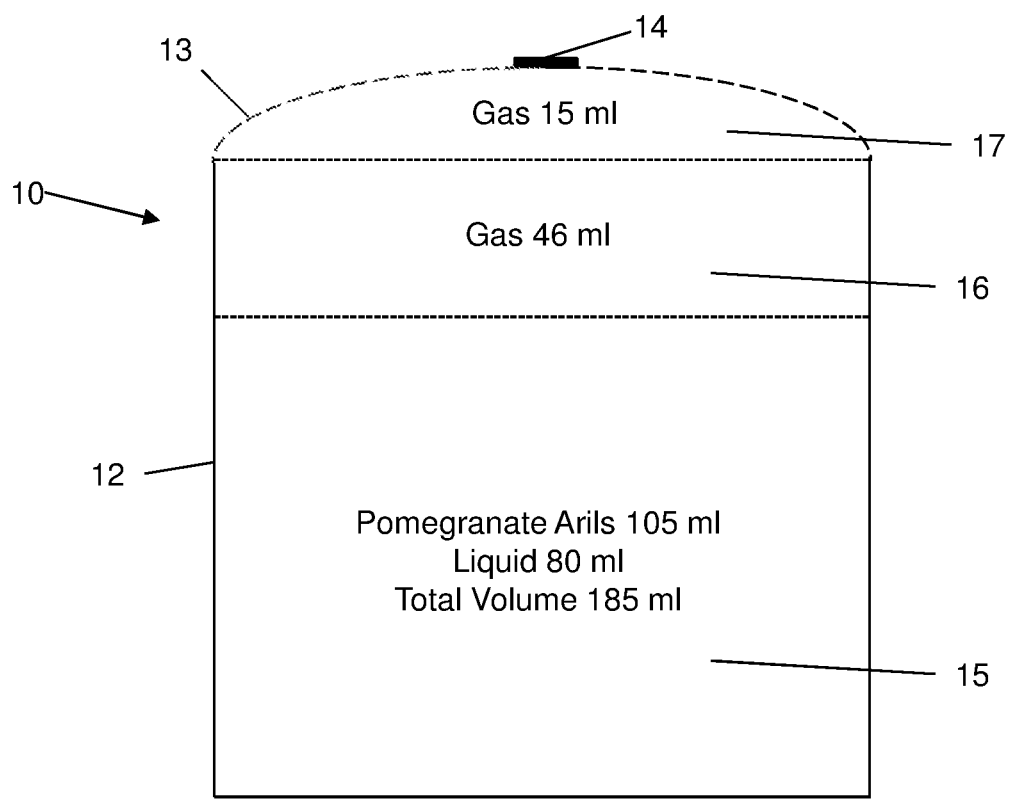
Figure 1C:
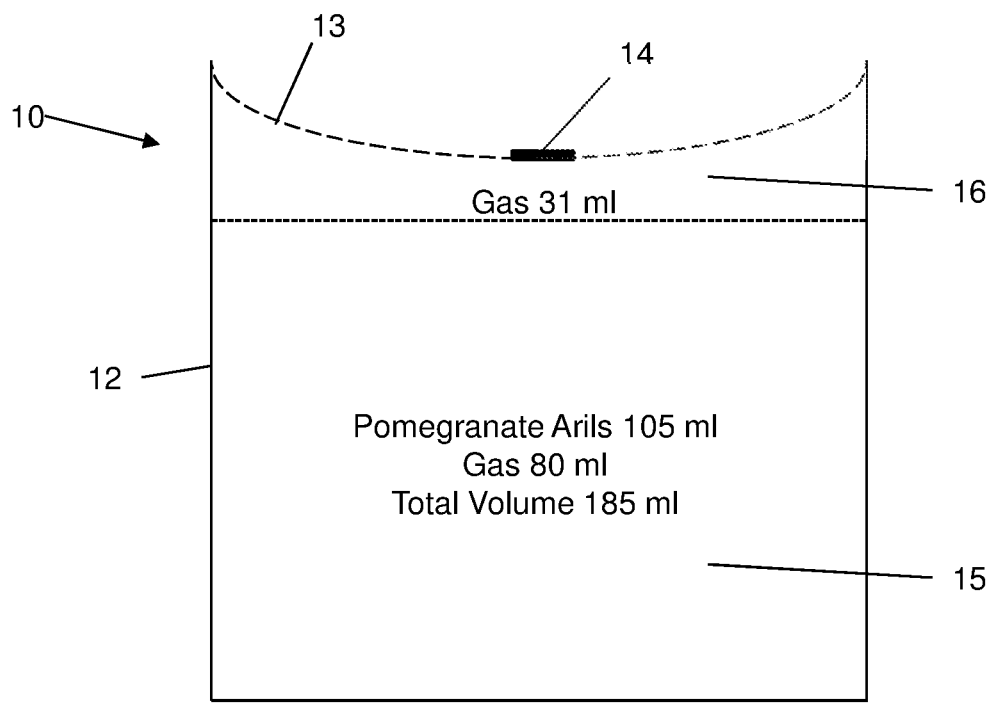

As shown in FIGS. 1A-1C, the present example presents a method of the invention with pomegranate arils in a container 10 comprising a substantially rigid cup 12 having a volume of about 231 ml with a flexible, spherical lid 13 having a one-way valve 14.

As shown in FIG. 1A, a substance-containing space 15 of the cup 12 having a volume of about 185 ml is filled with pomegranate arils and a liquid such as water, leaving about 46 ml of gas-filled headspace 16. The pomegranate arils consume about 105 ml of the substance-containing space 15, excluding voids between the arils. The voids between the arils consume about 80 ml of the substance-containing space 15. The voids between the arils are filled with about 80 ml of the liquid. The headspace 16 may be filled with atmospheric air or a gas such as nitrogen gas through flushing. Liquid nitrogen is added to the cup 12, and the cup 12 is sealed with the lid 13.

As shown in FIG. 1B, the liquid nitrogen vaporizes after sealing the cup 12, which expands the lid 13 to a maximum extended position and creates an internal expanded portion 17 of the container 10 having a volume of about 15 ml. An initial volume ($V_1$) is defined as the volume of the expanded portion 17 (15 ml) plus the volume of the headspace 16 (46 ml), which equals 61 ml. An initial pressure ($P_1$) of this volume may be 20 psi, 22 psi, or 27 psi, depending on the amount of liquid nitrogen initially added. An initial pressure of 20 or 22 psi may involve suction for removing the liquid (described below) and can result in a final pressure ($P_2$) less than 1 atm. An initial pressure of 27 psi can constitute an internal pressure sufficient to force the liquid from the container and can result in a final internal pressure at about atmospheric pressure (about 15 psi).

The container 10 is then subjected to high pressure processing to inactivate any microorganisms in the container 10 (e.g., microorganisms associated with any of the internal contents of the container 10). During the high pressure processing, the lid 13, may collapse from the extended position as shown in FIG. 1B to a collapsed position in which the lid 13 extends into the headspace 16. This is due to the high external pressures exerted on the outside of the container 10 as well as the slightly lower temperatures typically used for high pressure processing. The gas converts from the gas phase to the liquid phase under the high pressure, such as a pressure of about 200 MPa or higher.

After the high pressure processing is completed, the container 10 returns to a physical state as shown and described above for FIG. 1B. The gas converts from the liquid phase back to the gas phase under the lower pressure, such as a pressure below about 200 MPa. The container 10 is inverted so that the liquid fills the expanded portion 17 and the headspace 16. The liquid may then be expelled from the container 10 through the valve 14. Depending on the initial pressure in the cup 10, the liquid may be expelled by exerting a pressure on the outside of the container 10 (e.g., by squeezing), by suctioning via a tube or syringe, or simply by opening the valve to permit the increased pressure (in the case of a $P_1$ of 27 psi) to force the liquid through the valve. Regardless of the mechanism, the liquid removal involves in a reduction of internal pressure in the container 10. When the liquid is completely removed, the valve 14 is then closed, thus re-sealing the container 10.

As shown in FIG. 1C, removal of the liquid may result in the lid 13 converging into the headspace 16 in a maximum collapsed position. The final volume of the headspace 16 is the initial volume of the headspace 16 (46 ml) minus the volume occupied by the collapsed lid 13 (15 ml), which equals 31 ml. The final volume ($V_2$) of the nitrogen gas is the final volume of the headspace 16 (31 ml) plus the volume of displaced liquid (80 ml), which is 111 ml. The final pressure of the nitrogen gas ($P_2$) is 11 psi, 12 psi, or 15 psi, depending on whether the initial pressure of the nitrogen was 20 psi, 22 psi, or 27 psi, respectively.

The volume defined by the lid in either the maximum extended or maximum collapsed configurations is determined by:

$$V=(\pi \cdot h^2(3r-h))/3$$

r=radius of opening of cup
h=maximum height between opening of cup and lid in maximum extended or maximum collapsed configuration.

The initial and final gas pressures and volumes can be determined by Boyle's Law:

$$P_1V_1=P_2V_2$$

$P_1$=Initial Pressure
$V_1$=Initial Volume
$P_2$=Final Pressure
$V_2$=Final Volume The initial and final gas pressures and volumes outlined in the variations outlined above are as follows:

Option 1
 $P_1$=27 psi
 $V_1$=61 ml
 $P_2$=15 psi
 $V_2$=111 ml
Option 2
 $P_1$=22 psi
 $V_1$=61 ml
 $P_2$=12 psi
 $V_2$=111 ml
Option 3
 $P_1$=20 psi
 $V_1$=61 ml
 $P_2$=11 psi
 $V_2$=111 ml A wide range of initial pressures, initial volumes, final pressures, and final volumes are possible.

Various parameters in the present example are as follows:

| | |
|---|---|
| Cup Volume | 231 ml |
| Initial Headspace | 46 ml |
| Spherical Lid height | 1.28 cm |
| Spherical Lid Volume | 15 ml |
| Aril Bulk Density | 675 g/l |
| Aril Weight | 125 grams |
| Aril Volume (not including void space) | 105 ml |
| Aril Volume (including void space) | 185 ml |
| Aril Porosity | 43.22% |
| Liquid Added | 80 ml |
| Initial Pressure | 20 psi, 22 psi or 27 psi |

Variables to consider in using the present exemplified method with substances other than pomegranate arils and in different containers include the elasticity of lidding film (this affects the spherical lid volume for both $V_1$ and $V_2$), initial gas pressure ($P_1$), initial gas volume ($V_1$), initial headspace volume, bulk density of substance, porosity of substance, quantity of liquid added, cup size, spherical lid height, weight of substance, and temperature throughout process.

Example 2

The present example shows a method of displacing liquid from pomegranate arils with a gas in a flexible container by reducing the internal volume of the container at a substantially constant pressure.

Figure 2A:
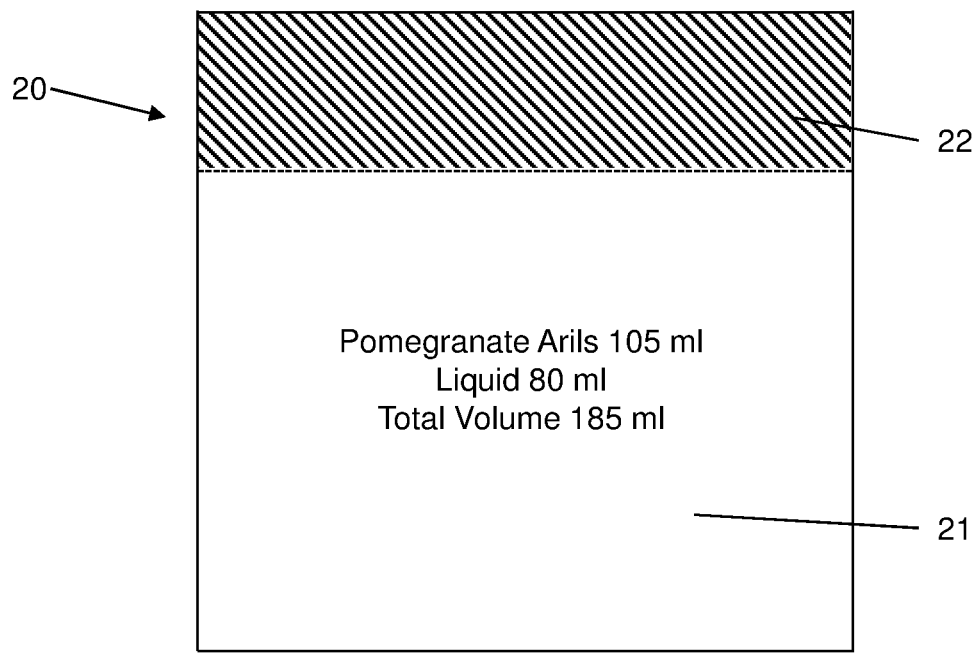
FIGS. 2A-2E show schematics of a container to illustrate aspects of a second version of the invention.

As shown in FIG. 2A, the container 20 in this example is a flexible pouch, such as a plastic or cellophane bag, having a maximum volume of 283.5 ml. A substance-containing space 21 of the container 20 defining a volume of about 185 ml is filled with pomegranate arils and a liquid such as water. The pomegranate arils consume about 105 ml (excluding voids between the arils) of the substance-containing space 21. The voids between the arils consume about 80 ml of the substance-containing space 21. The voids between the arils are filled with about 80 ml of the liquid. The arils have a bulk density of about 675 g/ml, are added at a weight of about 125 g, have a porosity of about 43.24%, and take up a volume (including voids) of about 185 ml. Liquid nitrogen is added to the container 20. The container 20 is sealed in a collapsed configuration comprising a collapsed portion 22, thereby defining a 185-ml total internal container volume.

Figure 2B:
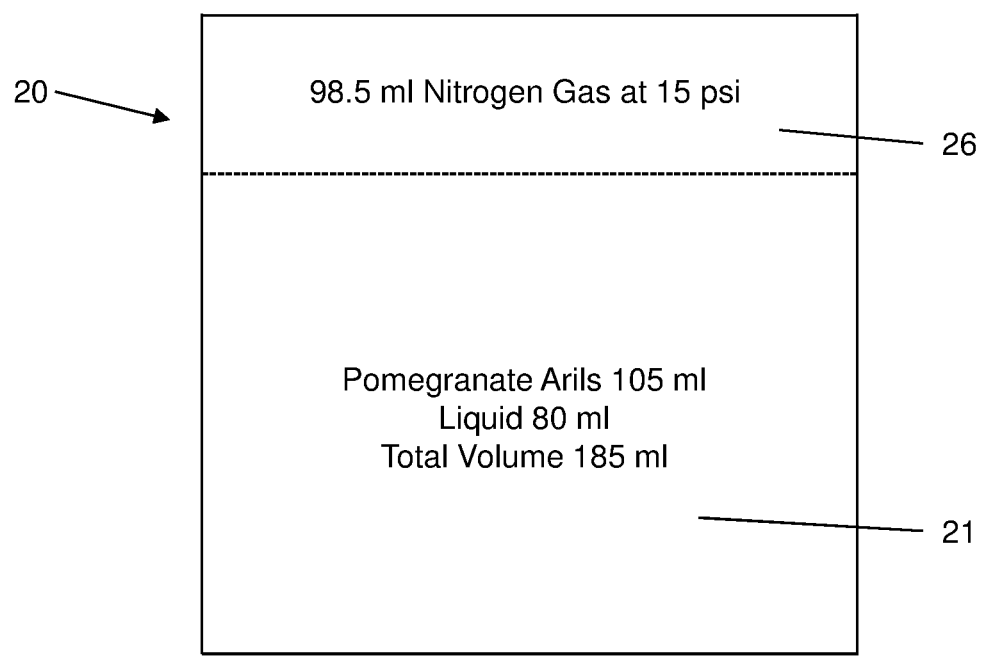

As shown in FIG. 2B, the nitrogen vaporizes after the sealing and expands the container 20 to form a nitrogen gas-filled headspace 26 having a volume of about 98.5 ml at a pressure of about 15 psi, thereby expanding the container to its maximum volume capacity of 283.5 ml.

The container 20 is then subjected to high pressure processing.

Figure 2C:
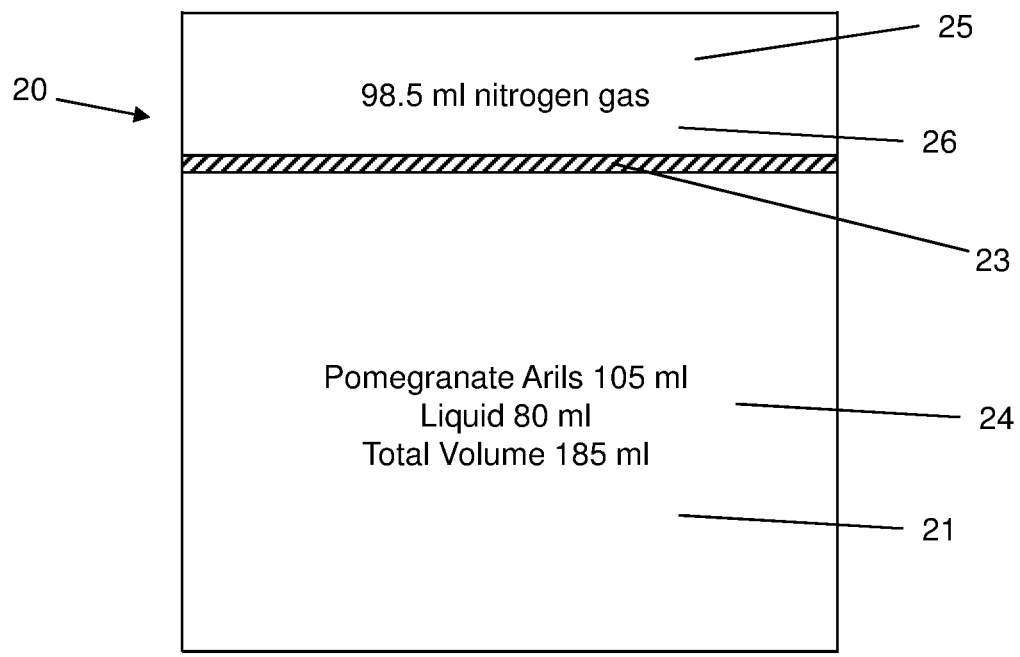

As shown in FIG. 2C, a restriction device 23 is then placed around the container 20 to generate a restricted space disposed between the substance-containing space 21 and the headspace 26, thereby defining a first reservoir space 24 comprising the pomegranate arils and liquid and a second reservoir space 25 comprising the nitrogen gas. The restricted space is dimensioned and configured to permit liquid to pass therethrough while preventing the arils to pass therethrough. The restriction device 23 may be moveable to adjust the respective volumes of the first reservoir space 24 and the second reservoir space 25.

Figure 2D:
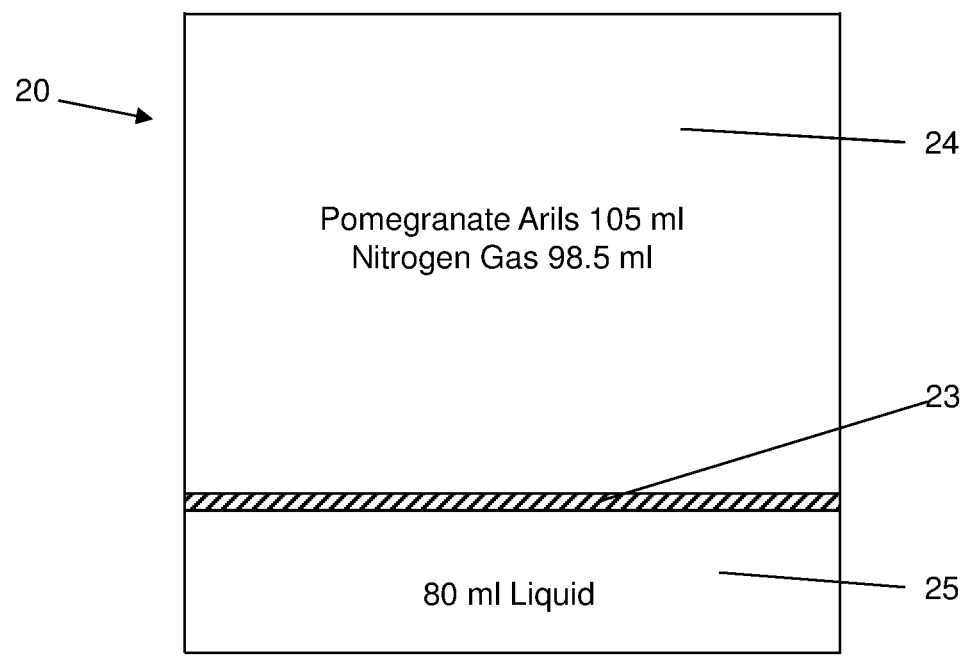

As shown in FIG. 2D, the container 20 is then inverted. By force of gravity, the 80 ml of liquid passes from the first reservoir space 24, through restricted space, and into the second reservoir space 25, while the 98.5 ml of nitrogen gas replaces the liquid in the voids between the arils in the first reservoir space 24. The restriction device 23 can be adjusted to reduce the relative volumes of the first reservoir space 24 and the second reservoir space 25 to fully accommodate the volume of the nitrogen gas, as shown.

Figure 2E:
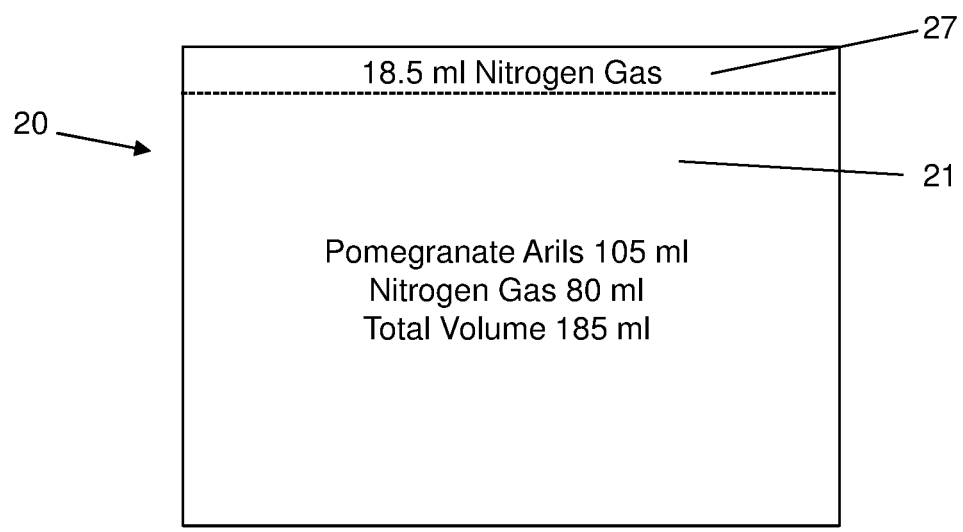

As shown in FIG. 2E, the container 20 is heat-sealed and separated at the restricted space, thereby removing the second reservoir space 25 comprising the liquid from the first reservoir space 25 comprising the nitrogen gas and the arils. This effectively reduces the volume of the container by about 80 ml. The final container 20 has a total volume of about 203.5 ml, comprising an 18.5-ml, nitrogen gas-filled headspace 27 and about 185 ml of arils (consuming a 105-ml volume excluding voids) and surrounding nitrogen gas (consuming an 80-ml volume) in the substance-containing space 21.

Thus, the original 80 ml of liquid present with the arils is effectively removed by displacing the liquid with the gas present in the container, partitioning the liquid away from the gas and the arils, and sealing and separating the gas and arils from the liquid in a manner that reduces the overall volume of the container. The internal pressure of the container throughout the process may remain at approximately a constant pressure, such as about atmospheric pressure (about 15 psi) or any pressures above or below atmospheric pressure.

Example 3

The present example shows a method of displacing liquid from pomegranate arils with a gas in a flexible container by reducing the internal volume and pressure of the container.

Figure 3A:
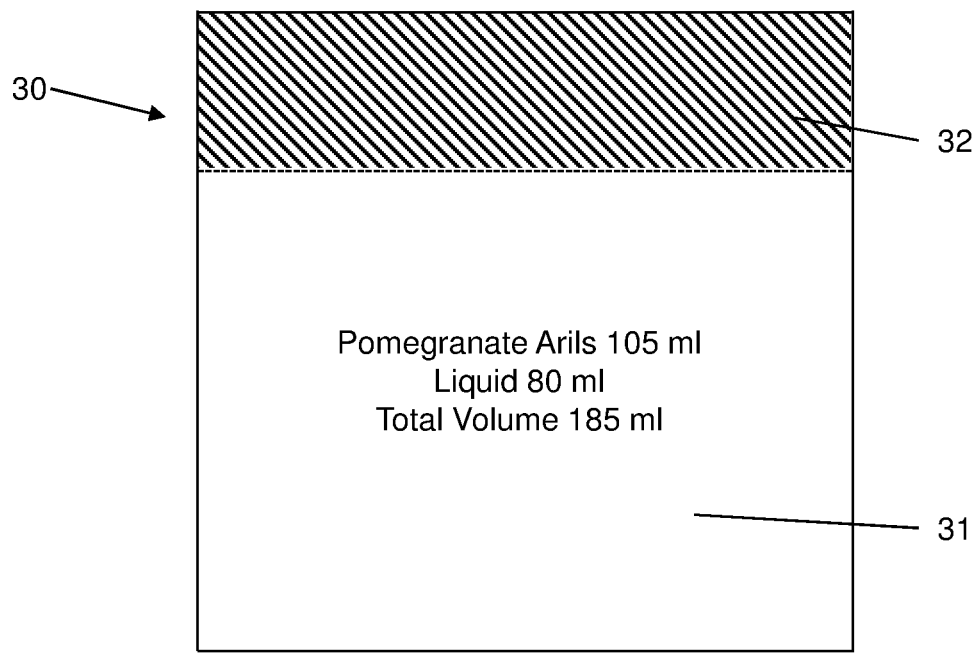
FIGS. 3A-3F show schematics of a container to illustrate aspects of a third version of the invention.

As shown in FIG. 3A, the container 30 in this example is a flexible pouch, such as a plastic or cellophane bag, having a maximum volume of 233 ml. A substance-containing space 31 of the container 30 defining a volume of about 185 ml is filled with pomegranate arils and a liquid such as water. The pomegranate arils consume about 105 ml (excluding voids between the arils) of the substance-containing space 31. The voids between the arils consume about 80 ml of the substance-containing space 31. The voids between the arils are filled with about 80 ml of the liquid. The arils have a bulk density of about 675 g/ml, are added at a weight of about 125 g, and have a porosity of about 43.24%, and take up a volume (including voids) of about 185 ml. Liquid nitrogen is added to the container 30. The container 30 is sealed in a collapsed configuration comprising a collapsed portion 32, thereby defining a 185-ml total internal container volume.

Figure 3B:
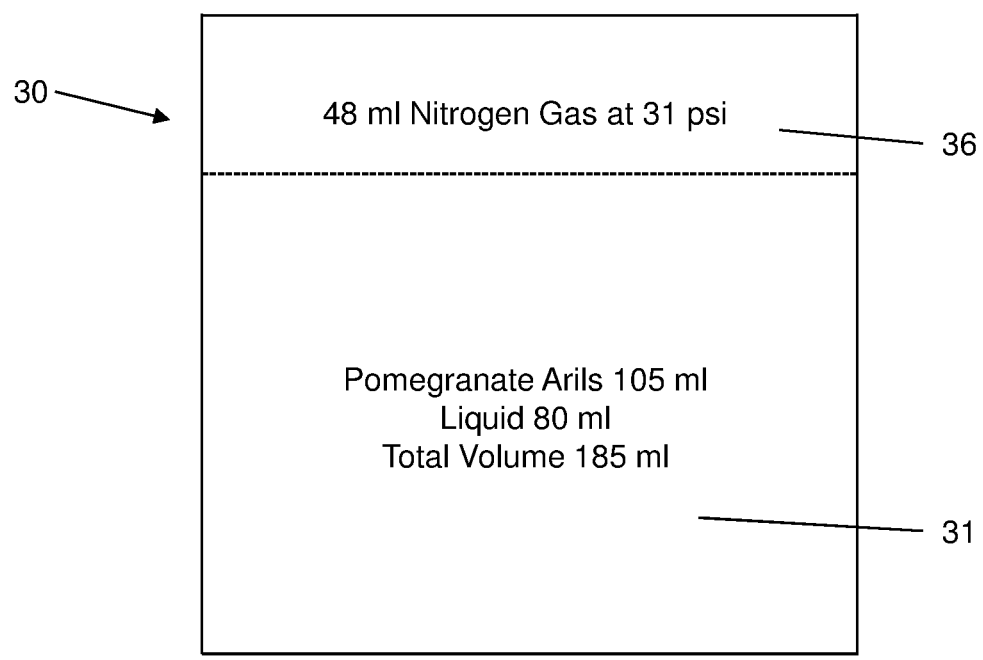

As shown in FIG. 3B, the nitrogen vaporizes after the sealing and expands the container 30 to generate a nitrogen gas-filled headspace 36 having a volume of about 48 ml at a pressure of about 31 psi, thereby expanding the container to its maximum volume capacity of 233 ml.

The container 30 is then subjected to high pressure processing.

Figure 3C:
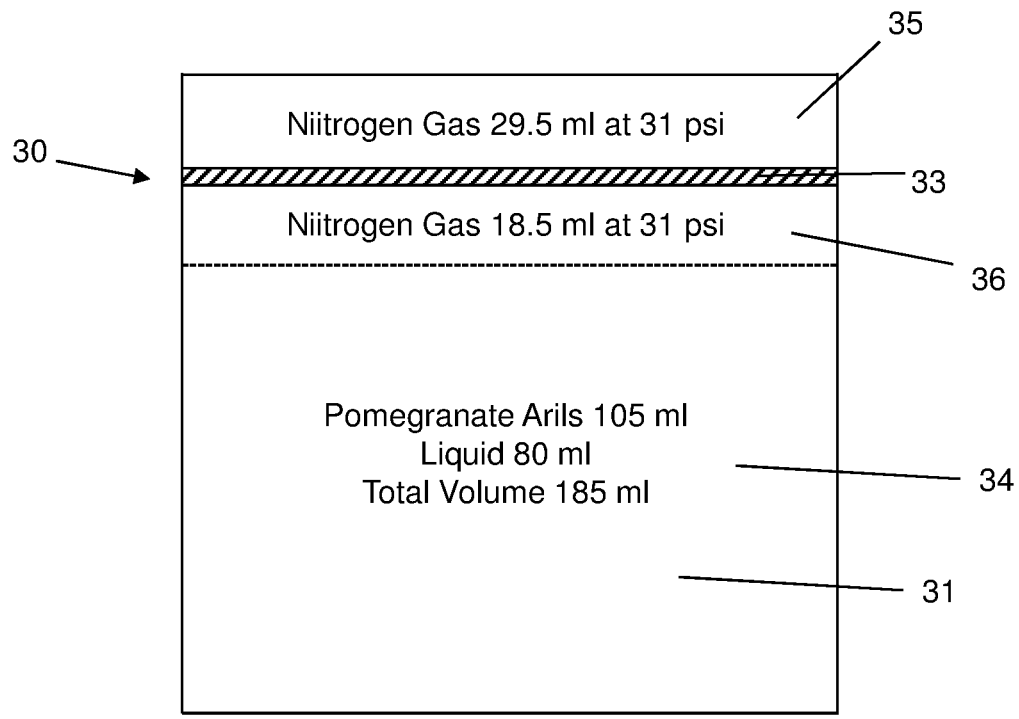

As shown in FIG. 3C, a restriction device 33, such as an outer clamp, is then placed around the headspace 36 of the container 30, thereby defining a first reservoir space 34 comprising the pomegranate arils, liquid, and some of the nitrogen gas and a second reservoir space 35 comprising the remaining nitrogen gas. The restricted space is dimensioned to permit liquid to pass therethrough while preventing the arils to pass therethrough.

Figure 3D:
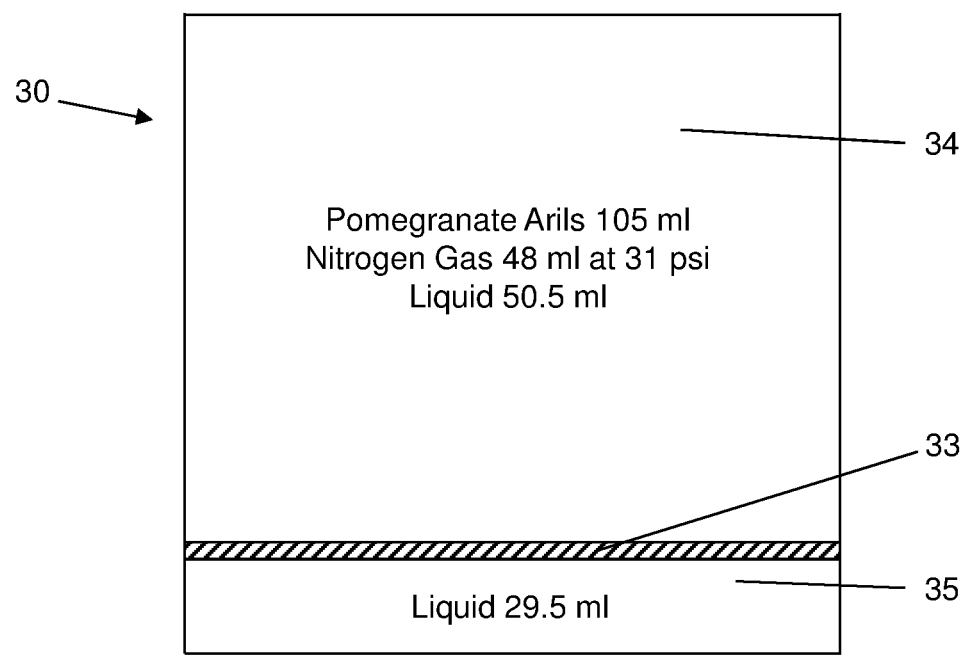

As shown in FIG. 3D, the container is then inverted. By force of gravity, 29.5 ml of the liquid passes from first reservoir space 34, through the restricted space, and into the second reservoir space 35, leaving 50.5 ml of the liquid remaining in first reservoir space 34, while the 29.5 ml of the nitrogen gas in the second reservoir space 35 enters the first reservoir space 34.

Figure 3E:
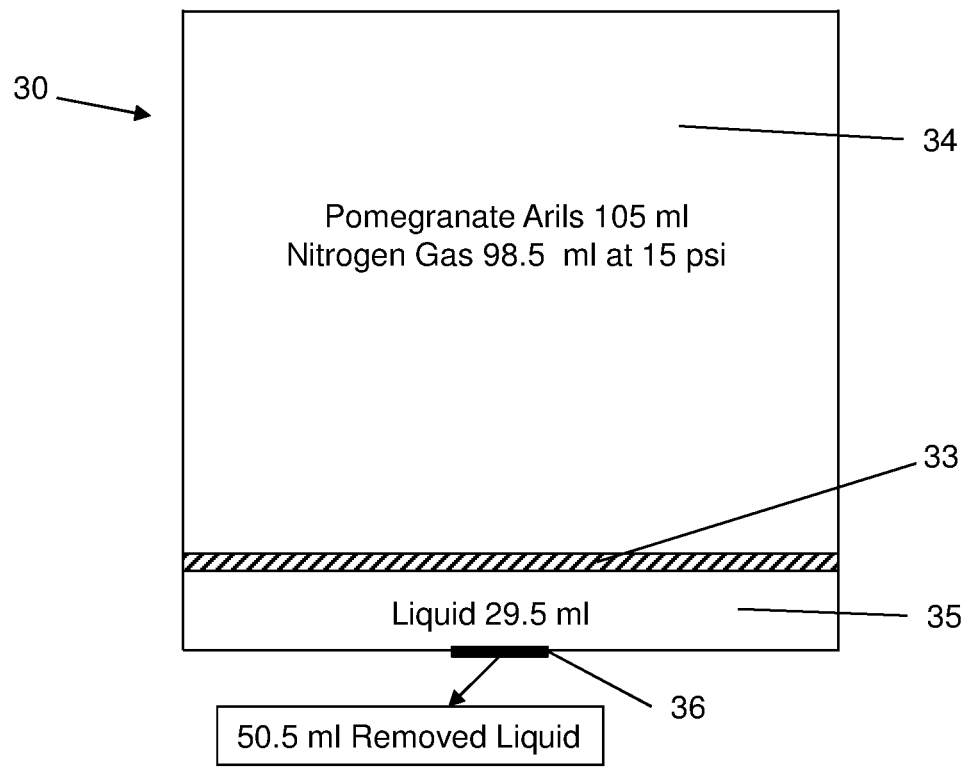

As shown in FIG. 3E, an outlet 36 of the second reservoir space 35 is generated or opened to remove at least about 50.5 ml of liquid from the container 30. This permits the 50.5 ml of liquid still remaining in the first reservoir space 34 to drain therefrom while the gas in the first reservoir space 34 expands and replaces the drained liquid by reducing its pressure from about 31 psi to about 15 psi. The liquid exiting the container prevents contamination from entering through the outlet.

Figure 3F:
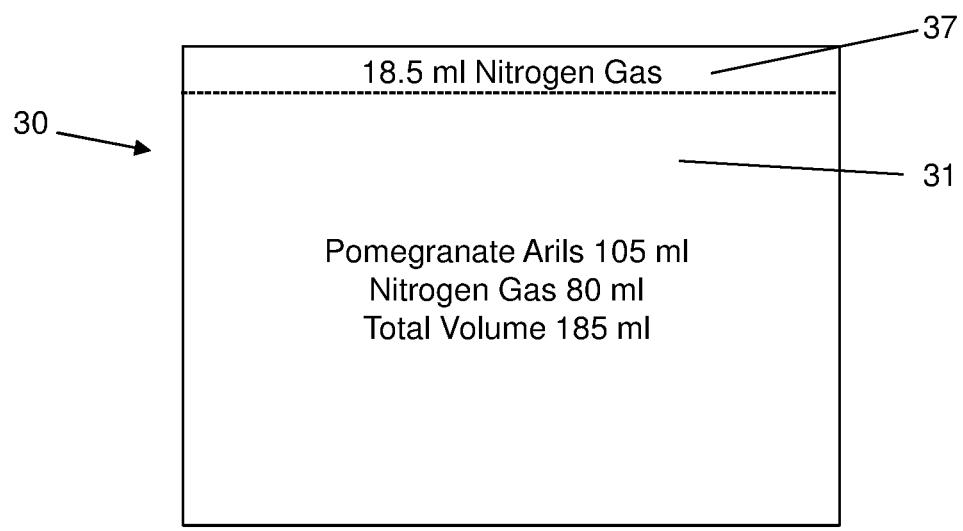

As shown in FIG. 3F, the container 30 is then heat-sealed at the restricted space, and the second reservoir space 35 comprising liquid is separated from the first reservoir space 34 comprising the nitrogen gas and the arils. This effectively reduces the volume of the container 30 by about 29.5 ml. The final container 30 has a total volume of about 203.5 ml, comprising about 105 ml of arils surrounded with 80 ml of nitrogen gas in the substance-containing space 31 and a nitrogen gas-filled headspace 37 of about 18.5 ml. The internal pressure of the container is about 15 psi.

Thus, the original 80 ml of liquid present with the arils is effectively removed by displacing the liquid with the 48 ml gas originally present in the container. The displacement occurs by expansion of the gas with a concomitant reduction of pressure from about 31 psi to about 15 psi. In addition, the liquid is partitioned away from the gas and the arils and separated therefrom in a manner that reduces the overall volume of the container.

Example 4

The present example shows an alternative method of displacing liquid from pomegranate arils with a gas in a flexible container by reducing the internal volume and pressure of the container.

Figure 4A:
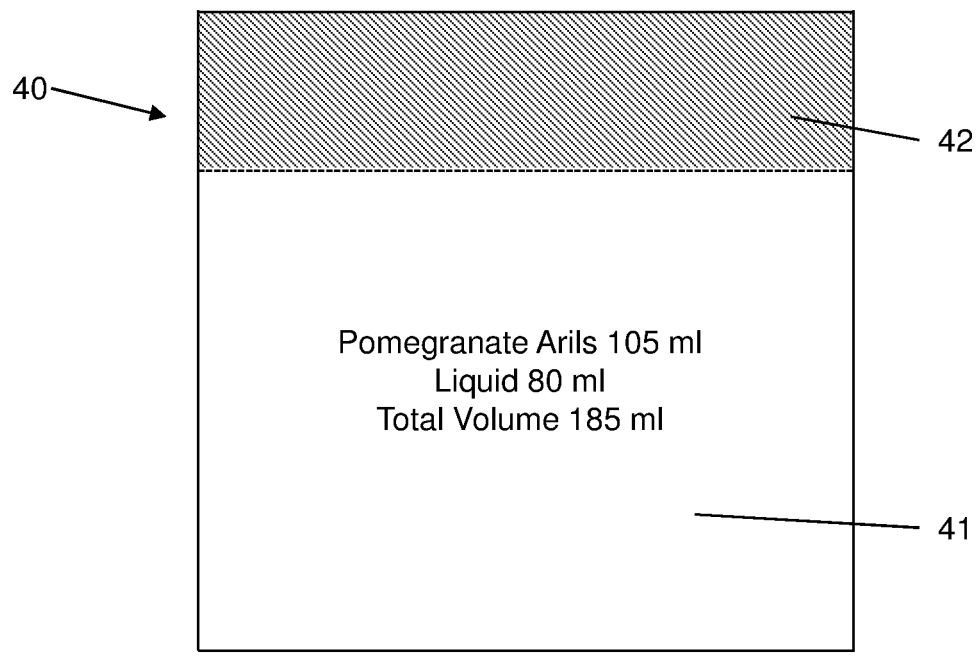
FIGS. 4A-4F show schematics of a container to illustrate aspects of a fourth version of the invention.

As shown in FIG. 4A, the container 40 in this example is a flexible pouch, such as a plastic or cellophane bag, having a maximum volume of 233 ml. A substance-containing space 41 of the container defining a volume of about 185 ml is filled with pomegranate arils and a liquid such as water. The pomegranate arils consume about 105 ml (excluding voids between the arils) of the substance-containing space 41. The voids between the arils consume about 80 ml of the substance-containing space 41. The voids between the arils are filled with about 80 ml of the liquid. The arils have a bulk density of about 675 g/ml, are added at a weight of about 125 g, have a porosity of about 43.24%, and take up a volume (including voids) of about 185 ml. Liquid nitrogen is added to the container 40. The container 40 is sealed in a collapsed configuration comprising a collapsed portion 42, thereby defining a 185-ml total internal container volume.

Figure 4B:
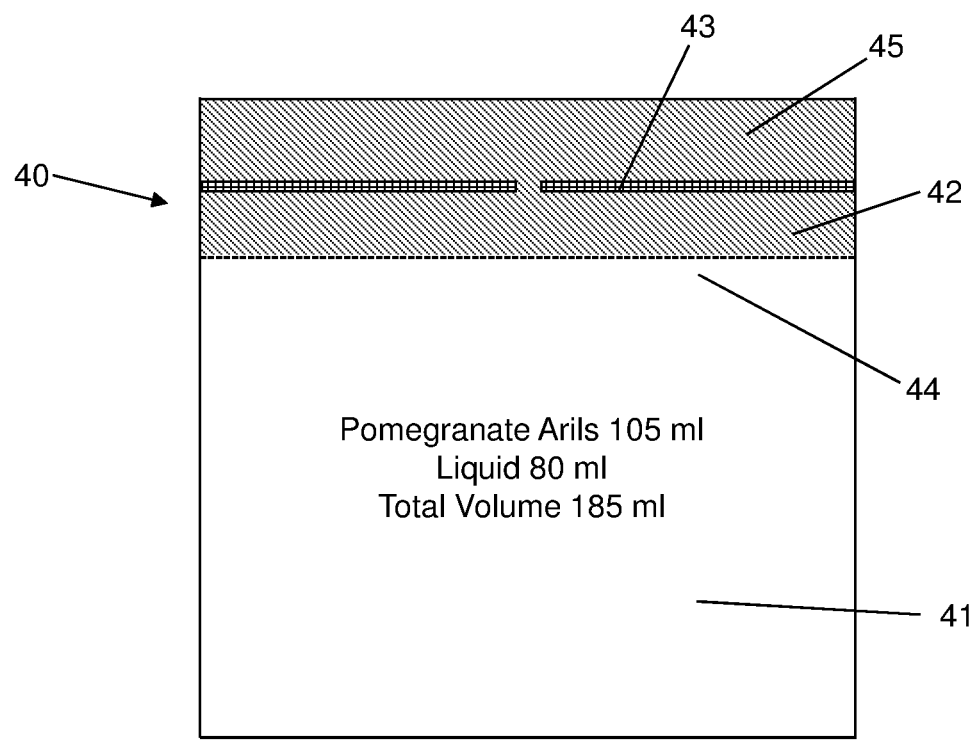

As shown in FIG. 4B, the collapsed portion 42 of the container is then partially heat-sealed to form a restriction device 43. The restriction device 43 defines a restricted space between a first reservoir space 44 and a second reservoir space 45.

Figure 4C:
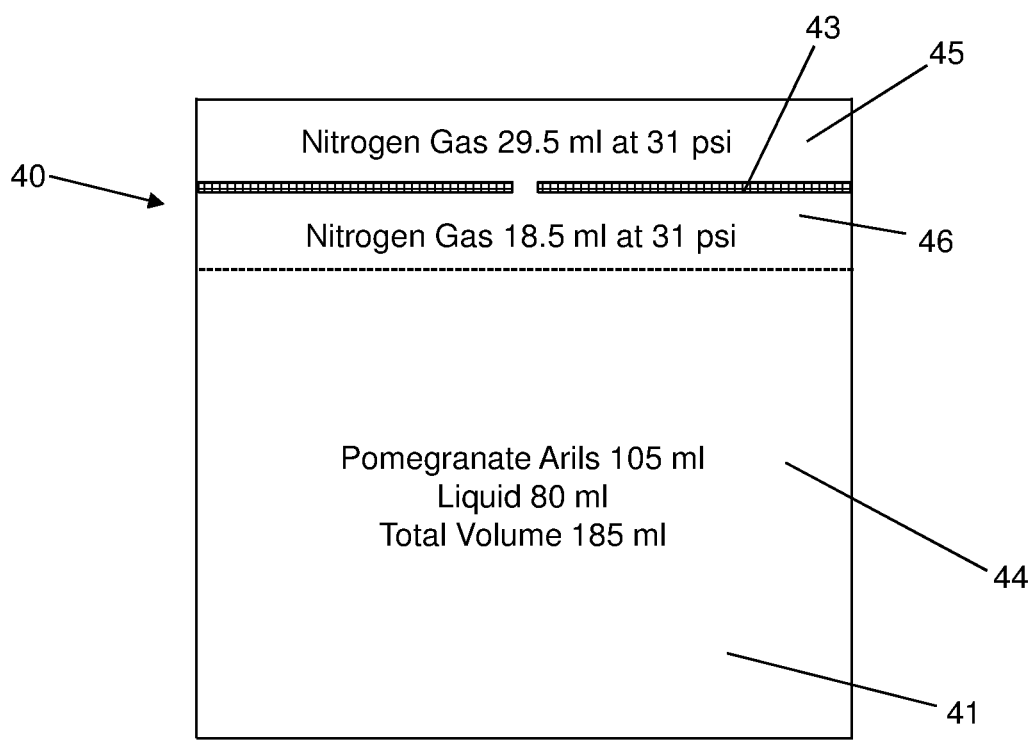

As shown in FIG. 4C, the nitrogen vaporizes after the restriction device 4 is formed and expands the container 40 to its maximum volume capacity of 233 ml at a pressure of 31 psi. The vaporized nitrogen distributes between the first reservoir space 44 and the second reservoir space 45, forming a headspace 46 with a volume of 18.5 ml above the substance-containing space 41 in the first reservoir space 44 and filling the second reservoir space 45 with a volume of 29.5 ml.

The container 40 is then subjected to high pressure processing.

Figure 4D:
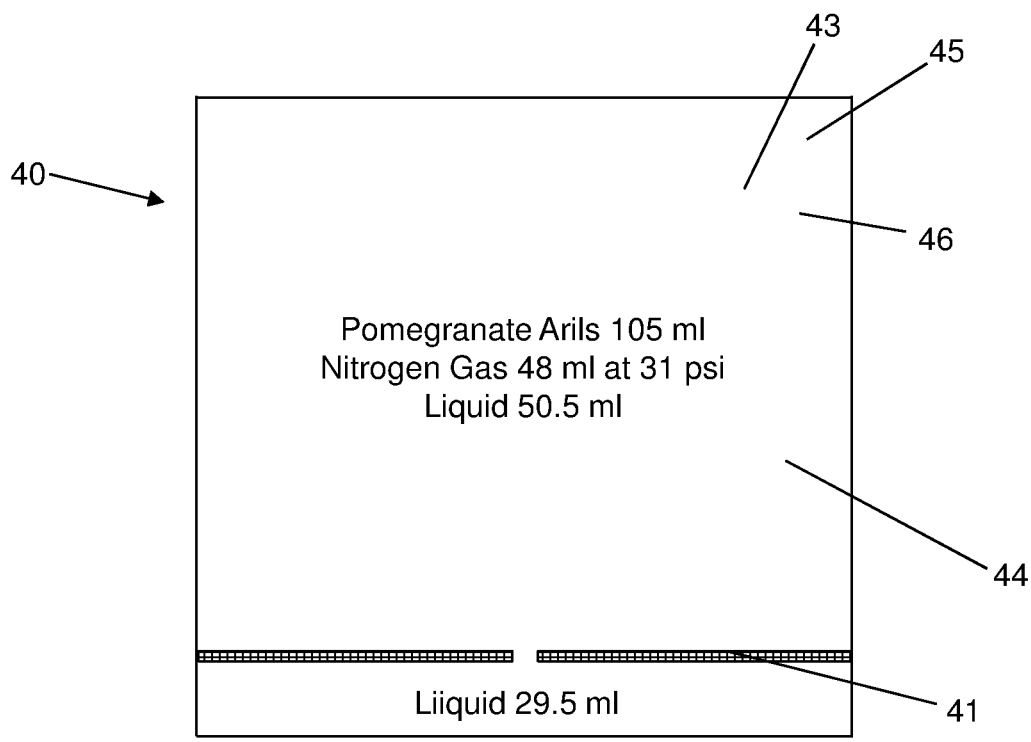

As shown in FIG. 4D, the container is then inverted. By force of gravity, 29.5 ml of the liquid passes from first reservoir space 44, through the restricted space, and into the second reservoir space 45, leaving 50.5 ml of the liquid remaining in first reservoir space 44, while the 29.5 ml of the nitrogen gas in the second reservoir space 45 enters the first reservoir space 44.

Figure 4E:
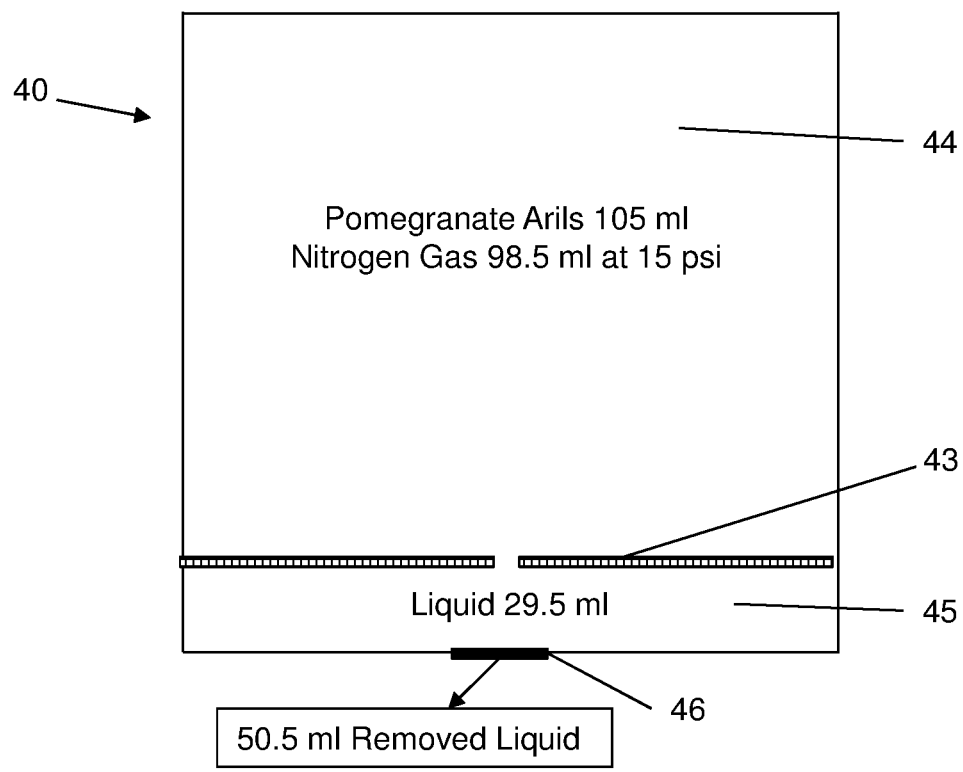

As shown in FIG. 4E, an outlet 46 of the second reservoir space 45 is generated or opened to remove at least about 50.5 ml of liquid from the container 40. This permits the 50.5 ml of liquid still remaining in the first reservoir space 44 to drain therefrom while the gas in the first reservoir space 44 expands and replaces the drained liquid by reducing its pressure from about 31 psi to about 15 psi. The liquid exiting the container prevents contamination from entering through the outlet.

Figure 4F:
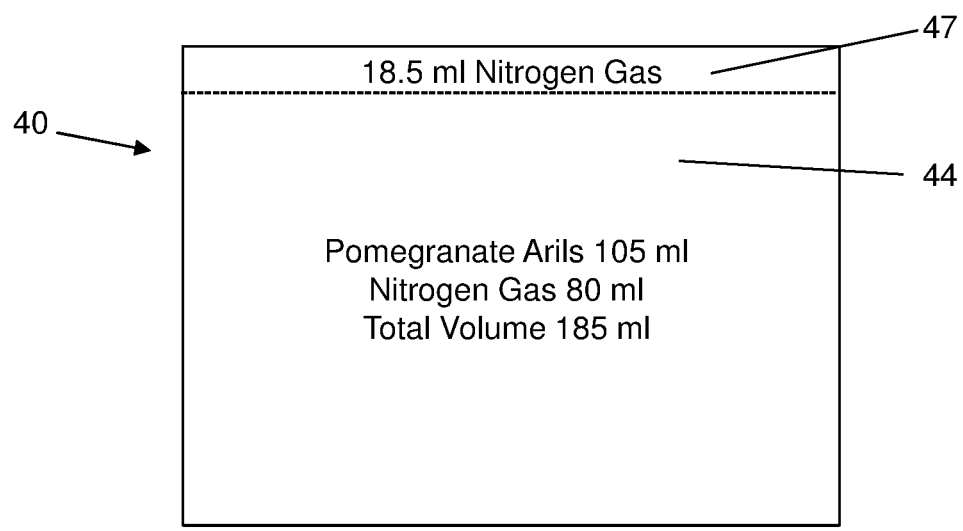

As shown in FIG. 4F, the restricted space is then heat-sealed, and the second reservoir space 45 comprising liquid is separated from the first reservoir space 44 comprising the nitrogen gas and the arils. This effectively reduces the volume of the container 40 by about 29.5 ml. The final container 40 has a total volume of about 203.5 ml, comprising about 105 ml of arils surrounded with 80 ml of nitrogen gas in the substance-containing space 41 and a nitrogen gas-filled headspace 47 of about 18.5 ml. The internal pressure of the container is about 15 psi.

Thus, the original 80 ml of liquid present with the arils is effectively removed by displacing the liquid with the 48 ml gas originally present in the container. The displacement occurs by expansion of the gas with a concomitant reduction of pressure from about 31 psi to about 15 psi. In addition, the liquid is partitioned away and separated from the gas and the arils in a manner that reduces the overall volume of the container.

Example 5

The present example shows methods of the invention in which gas is introduced after high pressure processing to remove liquid from the container.

About 185 ml of a 203.5-ml cup is filled with pomegranate arils and a liquid such as water, leaving about 18.5 ml of headspace. The pomegranate arils consume about 105 ml (excluding voids between the arils). The voids between the arils consume about 80 ml. The voids between the arils are filled with about 80 ml of the liquid. The arils have a bulk density of about 675 g/ml, are added at a weight of about 125 g, have a porosity of about 43.24%, and take up a volume (including voids) of about 185 ml. The headspace may be atmospheric air or be flushed with a gas such as nitrogen gas. The container is then subjected to high pressure processing to inactivate microorganisms.

After the high pressure processing is completed, the container is inverted, and two needles are inserted through the lidding. The needles may be inserted directly through the lidding, through valves, or through a re-sealable septum. The needles are preferably sterilized prior to insertion. A gas such as nitrogen is introduced through the first needle, while the liquid is removed with the second needle. Suction may or may not be applied to the second needle. The needles are then removed, and the openings through which the needles were inserted are sealed.

An alternative to using two needles is to use a single needle both to introduce the gas and then to remove the liquid. Another alternative is to use a single needle to introduce the gas, while using a valve, such as a one-way valve, to permit the liquid to simultaneously exit the container.

The final container contains about 185 ml of arils surrounded by gas and about 18.5 ml of headspace.

Example 6

The present example provides various embodiments of filling a container with a substance and a liquid, sealing the container, subjecting the container to high pressure processing, and then removing the liquid from the container.

In some embodiments, the liquid may be removed by heating to, for example, about room temperature and/or agitating the container after the high pressure processing to create pressure in the container. The heating and agitation may release gas from the liquid and expand the gas in the liquid and in the headspace of the container. The expansion of the gas may force most of the liquid and some of the gas to exit the container through, for example, a one-way valve.

In some embodiments, the pressure in the headspace of the container may be increased by adding a gas or liquid to the container through a second one-way valve. The outside of the container may also be subjected to external pressure to expel the liquid or gas through the one-way valve. Once the desired amount of liquid has been expelled from the container and the desired pressure has been attained inside the container, the temperature of the container may be lowered, causing the gas to contract inside the container. Lowering the temperature may or may not create a vacuum, which may or may not cause gases, such as oxygen, carbon dioxide, nitrogen, argon, or the like, to permeate through the container. The modified atmosphere in the container may or may not be maintained through the use of different container films with different gas and water vapor permeabilities. The container with the substance may then be stored in cold or otherwise proper storage to attain maximum shelf life.

In some embodiments, the container may comprise a one-way valve. In other embodiments, as described above, the container may comprise more than one one-way valve, wherein a first one-way valve is an inlet and the second one-way valve is an outlet. In some embodiments, the one-way valves may be prevented from opening until a certain pressure is reached or by opening a restriction on the one-way valve manually.

Depending on the substance being placed therein, the container may comprise a permeable, semipermeable, or non-permeable material.

The liquid inserted into the container may comprise a cold liquid such as, for example, water or fruit juice. In some embodiments, the liquid may contain a gas or a plurality of gases, such as carbon dioxide. In a particular embodiment, the liquid may comprise carbonated water at about 34° F.

In some embodiments, the product may comprise a foodstuff, such as a foodstuff that cannot normally suitably withstand high pressure processing without being crushed. For example, in some embodiments, the product comprises fruits and/or vegetables. In some embodiments, the product may be cold when placed into the container. For example, the product may be at a temperature below about 40° F. when placed into the container.

Some embodiments comprise inserting the foodstuff and a volume of a liquid containing a gas into a container, sealing the container, pressurizing the container, warming the container to about room temperature to increase pressure in the container, agitating the container, allowing the liquid and a portion of the gas out of the container, and cooling the container.

Example 7

The present example shows the fresh-like state maintained by foods using the methods of the invention.

A plastic bag was filled 50% by volume with arils, 25% by volume with liquid, and 25% by volume with gas and was sealed. The sealed bag was subjected to high pressure processing at about 30,000-87,000 PSI for about 30-240 s. After the high pressure processing, the bag was lightly pinched about halfway between the ends and was inverted to let gravity drain the liquid to the bottom portion. The bag was heat-sealed above the liquid, and the portion containing the arils and gas was separated from the portion containing the liquid.

The flavor, color, and texture of the arils were then compared with raw arils. The flavor, color, and texture of the high pressure processed arils were the same as for the raw arils. These qualities of the high pressure processed arils are maintained for a significant amount of time during storage.

The same process above was performed with pears and peaches. The high pressure processed fruit was compared with thermally processed fruit using a retort (saturated steam) method. In contrast to the thermally processed fruit, all but one of tested parameters of the high pressure processed fruit was the same with those of the raw fruit. The only difference between the high pressure processed fruit and the raw fruit was that the high pressure processed fruit, as with the thermally processed fruit, became slightly translucent. A summary of the remaining parameters are provided below:
Parameters Tested (Raw, High Pressure Processed, Thermally Processed)
Fruit integrity (100%, 100%, 90%)
Yield (100%, 100, 95%)
Firmness peach (10 psi, 9 psi, 5 psi)
Firmness pear (18 psi, 18 psi, 8 psi)
Sensory (raw, raw, cooked)

Example 8

The present example discusses aspects of liquid nitrogen addition. The amount of liquid nitrogen to be added can be determined using the ideal gas law:

$$PV=nRT$$

Where:
P=Pressure
V=Volume
n=moles of gas
R=gas constant
T=Temperature
Because the desired initial pressure, volume, gas constant (0.082057 L atm mol$^{-1}$ K$^{-1}$), and temperature are known, the ideal gas law can be used to calculate how many moles of nitrogen need to be added to the container as liquid nitrogen before sealing the package. The temperature of the liquid nitrogen will determine its density. As an example, liquid nitrogen at a temperature of −196° C. has a density of 0.808 g/ml. The molecular weight of nitrogen is 28.0134 g/mol. The amount of liquid nitrogen to be added may be affected by the time that lapses between adding the nitrogen and sealing the package. More nitrogen may need to be added if some is lost to the atmosphere before the package is sealed.

What is claimed is:

1. A method of processing an edible substance, comprising:
    introducing the edible substance, a gas, and a liquid within a container, wherein the edible substance is at least partially immersed in the liquid within the container;
    sealing the edible substance, the gas, and the liquid within the container to form a sealed container; then
    externally pressurizing the sealed container by an amount and for a time sufficient to inactivate one or more microbes, wherein the externally pressurizing the sealed container comprises subjecting the sealed container to a pressure of from 2,000 psi to 150,000 psi; then
    displacing at least a portion of the liquid from the edible substance with the gas, wherein the displacing comprises partitioning the gas and the edible substance in a first reservoir space within the sealed container and the at least the portion of the liquid in a second reservoir space within the sealed container; and
    sealing the edible substance and the gas from at least a portion of the displaced liquid, wherein the sealing the edible substance and the gas from the at least the portion of the displaced liquid comprises:
        sealing the first reservoir space from the second reservoir space; and
        sealing the second reservoir space from the first reservoir space; and
        removing the second reservoir space from the first reservoir space.

2. The method of claim 1, wherein the introducing and the sealing the edible substance, the gas, and the liquid within the container comprises introducing and sealing the gas in vapor phase within the container.

3. The method of claim 1, wherein the introducing and the sealing the edible substance, the gas, and the liquid within the container comprises introducing and sealing the gas in condensed phase within the container and further comprising, after the introducing and the sealing the edible substance, the gas, and the liquid within the container, vaporizing the gas within the sealed container.

4. The method of claim 1, wherein the partitioning comprises passing the at least the portion of the liquid through a restricted space between the first reservoir space and the second reservoir space, the restricted space being permeable to the liquid but not the edible substance.

5. The method of claim 1, wherein the partitioning comprises removing some of the liquid from the second reservoir space prior to the sealing the edible substance and the gas from the at least the portion of the displaced liquid.

6. The method of claim 5, wherein the removing comprises removing at least a volume of the liquid equal to a total volume of the liquid present in the sealed container during the external pressurizing minus a maximum volume defined by the second reservoir space.

7. The method of claim 1, wherein the externally pressurizing the sealed container comprises subjecting the container to a pressure of from 2,000 psi to 150,000 psi at a temperature below 90° C.

8. The method of claim 1, wherein the gas comprises atmospheric air.

9. The method of claim 1, wherein the gas is selected from the group consisting of carbon monoxide, nitric oxide, nitrous oxide, hydrogen, oxygen, a noble gas, carbon dioxide, nitrogen, and mixtures thereof.

10. The method of claim 1, wherein the gas is selected from the group consisting of carbon monoxide, nitric oxide, nitrous oxide, hydrogen, a noble gas, carbon dioxide, nitrogen, and mixtures thereof.

11. A method of processing an edible substance, comprising:
    introducing the edible substance, a gas, and a liquid within a container, wherein the edible substance is at least partially immersed in the liquid within the container, wherein the gas is selected from the group consisting of carbon monoxide, nitric oxide, nitrous oxide, hydrogen, oxygen, a noble gas, carbon dioxide, nitrogen, and mixtures thereof;
    sealing the edible substance, the gas, and the liquid within the container to form a sealed container; then
    externally pressurizing the sealed container by an amount and for a time sufficient to inactivate one or more microbes, wherein the externally pressurizing the sealed container comprises subjecting the sealed container to a pressure of from 2,000 psi to 150,000 psi at a temperature below 90° C.; then
    displacing at least a portion of the liquid from the edible substance with the gas, wherein the displacing comprises partitioning the gas and the edible substance in a first reservoir space within the sealed container and the at least the portion of the liquid in a second reservoir space within the sealed container; and
    sealing the edible substance and the gas from at least a portion of the displaced liquid, wherein the sealing the edible substance and the gas from the at least the portion of the displaced liquid comprises:
sealing the first reservoir space from the second reservoir space;
sealing the second reservoir space from the first reservoir space; and
removing the second reservoir space from the first reservoir space.

12. The method of claim 11, wherein the gas is selected from the group consisting of carbon monoxide, nitric oxide, nitrous oxide, hydrogen, a noble gas, carbon dioxide, nitrogen, and mixtures thereof.

* * * * *